United States Patent
Valler

(10) Patent No.: US 8,936,119 B1
(45) Date of Patent: Jan. 20, 2015

(54) ELECTRIC ALL-WHEEL DRIVE VEHICLE POWERTRAIN

(71) Applicant: GM Gobal Technology Operations LLC, Detroit, MI (US)

(72) Inventor: Gary R. Valler, Greenfield, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/946,078

(22) Filed: Jul. 19, 2013

(51) Int. Cl.
*B60K 6/20* (2007.10)
*B60K 6/52* (2007.10)

(52) U.S. Cl.
CPC ............... *B60K 6/52* (2013.01); *Y10S 903/902* (2013.01)
USPC ........................................ 180/65.21; 903/902

(58) Field of Classification Search
USPC .............................. 180/65.1–65.31
See application file for complete search history.

(56) References Cited

U.S. PATENT DOCUMENTS

| 7,661,495 B2 * | 2/2010 | Zohrer et al. | 180/65.22 |
| 8,011,461 B2 * | 9/2011 | Rodriguez et al. | 180/65.23 |

* cited by examiner

*Primary Examiner* — John Walters
*Assistant Examiner* — James Triggs
(74) *Attorney, Agent, or Firm* — Quinn Law Group, PLLC

(57) ABSTRACT

An all-wheel drive vehicle includes a first drive axle and a second drive axle, a transaxle, an internal combustion engine, and an electric motor. The first drive axle and second drive axle are separated by a distance, and each drive axle is coupled with a respective pair of drive wheels. The transaxle is disposed in mechanical communication with the first drive axle, and is coupled to the internal combustion engine through a driveshaft. The electric motor is circumferentially disposed about the driveshaft, between the internal combustion engine and the transaxle, and is in mechanical communication with the second drive axle.

6 Claims, 1 Drawing Sheet

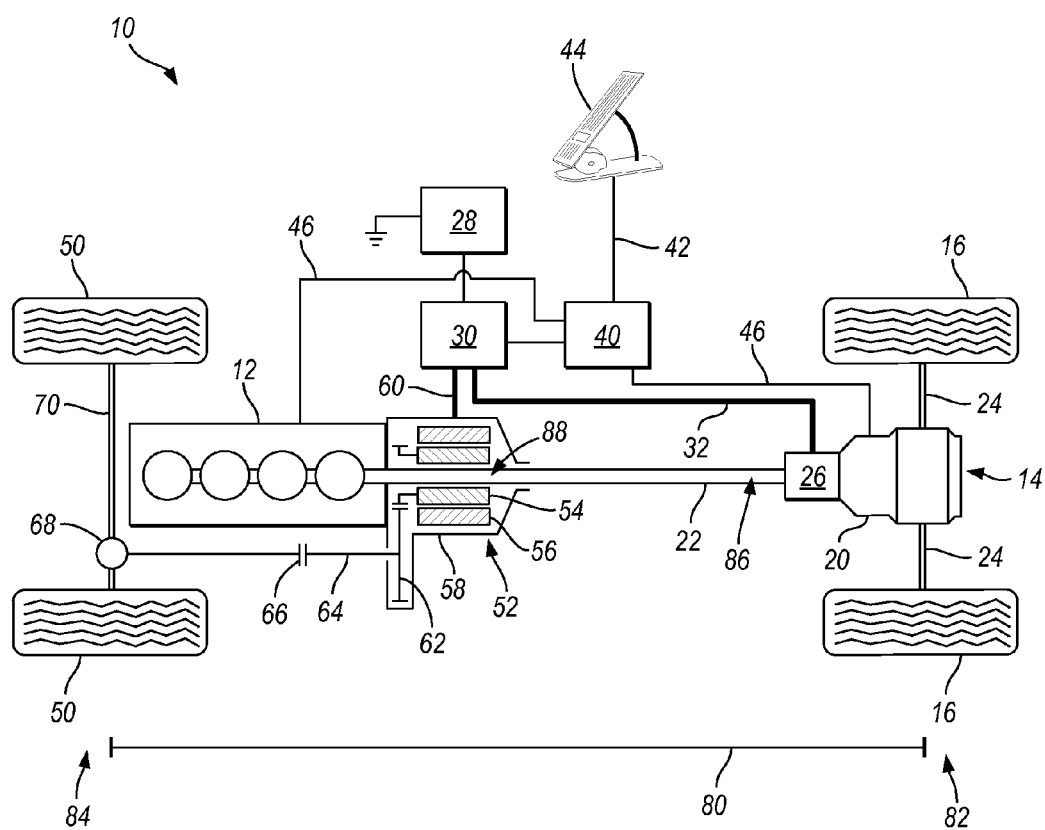

ELECTRIC ALL-WHEEL DRIVE VEHICLE POWERTRAIN

TECHNICAL FIELD

The invention relates to a system and a method for controlling operation of an electric all-wheel drive hybrid vehicle.

BACKGROUND

Modern vehicles are typically configured as either two- or all-wheel drive. Either type of vehicle may employ a conventional powertrain, where a single engine is used to propel the vehicle, or a hybrid powertrain, where two or more distinct power sources, such as an internal combustion engine and an electric motor, are used to accomplish the same task. Furthermore, a multi-speed automatically-shiftable transmission may be employed as part of either type of a powertrain, and may thus be used in a hybrid vehicle with all-wheel drive.

In order to maximize fuel efficiency of a hybrid powertrain, the vehicle's engine may be shut off when engine torque is not required for driving the vehicle. Such a situation may be encountered when the hybrid vehicle is maintaining a steady cruising speed, is in a coast down mode, i.e., when the vehicle is decelerating from elevated speeds, or is stopped.

SUMMARY

An all wheel drive vehicle includes a first plurality of drive wheels, a second plurality of drive wheels, an internal combustion engine, a transaxle, and an all wheel drive (AWD) electrical motor. The internal combustion engine is in mechanical communication with the transaxle, and is configured to provide a first torque to the first plurality of drive wheels. In one configuration, the first plurality of drive wheels are rear wheels of the vehicle, and the second plurality of wheels are front wheels of the vehicle. A driveshaft is operatively disposed between the internal combustion engine and the transaxle and is configured to transmit a generated torque from the engine to the transaxle. The driveshaft includes a first end portion coupled with the internal combustion engine, and a second end portion coupled with the transaxle.

The AWD electric motor/generator is provided in mechanical communication with the second plurality of drive wheels and may be mechanically isolated from the first plurality of drive wheels. The AWD electric motor/generator is configured to provide a second torque to the second plurality of drive wheels.

In one configuration, the AWD electric motor/generator may be circumferentially disposed about the first end portion of the driveshaft and adjacent to the internal combustion engine. In this arrangement, the AWD electric motor/generator may include an annular rotor that is concentrically disposed within a stator. The driveshaft may then extend through the center portion of the annular rotor.

The transaxle may be a hybrid-electric transaxle that may include an electric motor/generator (i.e., a second motor/generator) that is in mechanical communication with the first plurality of drive wheels. In this manner, the first torque (provided to the first drive wheels) may be a combination of a torque from the internal combustion engine, and a torque from the second motor/generator.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic top view of a hybrid all-wheel drive vehicle having a hybrid gas/electric drive axle, and an electric-only drive axle.

DETAILED DESCRIPTION

Referring to the drawing, FIG. 1 schematically illustrates a vehicle 10 equipped with an electric all-wheel drive powertrain. The vehicle 10 may include an internal combustion engine 12 in power-flow communication with a transaxle 14, and a first plurality of drive wheels 16 (i.e., primary drive wheels 16). The engine 12, transaxle 14, and drive wheels 16 may cooperate to provide a primary motive force to the vehicle 10. The internal combustion engine 12 may be a spark-ignited gasoline engine, a compression-ignited diesel engine, and/or may be configured to operate by combusting one or more other volatile compounds/fuels, such as alcohol, ethanol, methanol, biofuel, or any other fuel known in the art.

In one configuration, the transaxle 14 may include a multi-gear automatic transmission 20 that may utilize a gear train and multiple torque transmitting devices to generate discrete gear ratios between a driveshaft 22 and one or more output shafts 24 of the transmission 20. Although not shown, the existence of various gear trains, constructed from combinations of a range of planetary gear sets, and torque transmitting devices, such as clutches and/or brakes, combined to form functional automatic transmissions will be appreciated by those skilled in the art. It is intended that the torque transmitting devices of the transmission 20 may be operated via a hydraulic or fluid pressure that is generated by a fluid pump that is operatively connected to the transmission. As may be appreciated, the transmission 20 may selectively transmit a torque generated by the internal combustion engine 12 to the primary drive wheels 16.

In some configurations, the transaxle 14 may further include one or more electric motors 26 capable of augmenting the torque produced by the engine 12. The electric motor 26 may be embodied as a multi-phase permanent magnet/AC induction machine rated for approximately 60 volts to approximately 300 volts or more depending on the vehicle design. The electric motor 26 may be electrically connected to a rechargeable traction battery 28 via a power inverter module (PIM) 30 and a high-voltage bus 32. The PIM 30 may generally be configured for converting DC power to AC power and vice versa as needed. The battery 28 may be selectively recharged using torque from the electric motor 26 when that motor 26 is actively operating as a generator, e.g., by capturing energy during a regenerative braking event or when being driven by the engine 12. As may be appreciated, the electric motor 26 may be an electric motor, an electric generator, a motor/generator, or any combination thereof. In some embodiments, such as plug-in HEV (PHEV), the battery 28 may also be recharged via an off-board power supply (not shown) when the vehicle 10 is idle.

In addition to a transmission 20 and electric motor 26, the transaxle 14 may include an integrated differential that may allow each of the primary drive wheels 16 to rotate at a different speed in response to an input torque from the driveshaft 22. The differential may be configured in any manner known in the art.

In one configuration, the operation of the engine 12 and transaxle 14 may be controlled by one or more controllers 40 that are disposed in electrical communication with the engine 12/transaxle 14. The controller 40 may include, for example, an engine control module (ECM), a transmission control module (TCM), and/or a hybrid control module (HCM). The controller 40 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The controller 40 may be configured to automatically perform one or more control/processing routines that may be embodied as software or firmware associated with the device.

The controller 40 may be operative to receive a torque request 42 from a user input device 44 such as an accelerator pedal, and may provide one or more torque actuation commands 46 to the engine 12 or transaxle 14 in response. The torque actuation commands 46 may include, for example, commands to increase the amount of fuel and/or air provided to a combustion engine and/or an amount of torque to be produced or received by one or more electric motors. In response to the torque actuation commands 46, the engine 12/transaxle 14 may produce a corresponding output torque at the primary drive wheels 16. Additionally, the engine 12/transaxle 14 may provide one or more feedback signals to the controller 40 that describe the current operating status of the respective devices. These feedback signals may include, for example, an indication of the current torque and/or rotational speed of the various components. The controller 40 may further be operative to determine and command a desired torque/torque transmission ratio to the transmission 20 based on the received torque request 42 from the user input device 44, and a received indication of the current rotational speed of the various components.

In addition to the engine 12 and transaxle 14 that are configured to drive the first plurality of drive wheels 16, the vehicle 10 may include a second plurality of drive wheels 50 that are configured to be driven by a second electric motor 52 (i.e., the all-wheel drive (AWD) motor 52). The AWD motor 52 may include an annular rotor 54 disposed concentrically within a stator 56 that is fixed relative to the engine 12 and within a housing 58. The annular rotor 54 may be circumferentially disposed about the driveshaft 22, such that the driveshaft 22 passes through the center of the rotor 54 as it extends between the engine 12 and transaxle 14.

The AWD motor 52 may be embodied as a multi-phase permanent magnet/AC induction machine rated for approximately 60 volts to approximately 300 volts or more depending on the vehicle design. The AWD motor 52 may be powered by the PIM 30 via a second high voltage bus 60 that may be separate from the first high voltage bus 32. As may be appreciated, the AWD motor 52 may be an electric motor, an electric generator, a motor/generator, or any combination thereof.

The AWD motor 52 may be in mechanical, power-flow communication with the second plurality of drive wheels 50 through one or more gears (e.g., gear 62), shafts 64, clutches 66, differentials 68, axles 70 or other torque transmitting devices. Moreover, the AWD motor 52 may be physically isolated from the first plurality of drive wheels 16 such that the motor 52 neither provides, nor receives torque from the drive wheels 16.

The arrangement of the various vehicle components is worth specifically noting, as it provides certain benefits to the configuration of the vehicle 10 and available passenger space. In particular, the vehicle 10 includes a first plurality of drive wheels 16 and a second plurality of drive wheels 50 that are separated by a distance 80. In general, the first plurality of drive wheels 16 may define a first end portion 82 of the vehicle 10, and the second plurality of drive wheels 50 may define a second end portion 84 of the vehicle. In one non-limiting example, the first end portion 82 may generally define the rear of the vehicle 10, while the second end portion 84 may generally define the front of the vehicle 10 (i.e., as with a front-engine, rear-wheel drive vehicle configuration).

Each set of drive wheels may include a respective drive axle/shaft 24, 70 that extends between two of the wheels, and which is used to transmit a torque to/from the respectively coupled wheels. Each drive axle 24, 70 may be split, such as via a differential, to accommodate different rotational speeds by the different wheels.

A transaxle 14 may generally be disposed along the drive axle 24 and at the first end portion 82 of the vehicle 10. The transaxle 14 may be coupled with a first end portion 86 of the driveshaft 22, and may be configured to selectively transmit a torque from the driveshaft 22 to the first plurality of vehicle wheels 16. In one configuration, a portion of the transaxle 14 may extend between the respective drive axles 24, 70. The transaxle 14 may include an electric motor 26 that is integrated, or substantially integrated with an automatic transmission 20.

The internal combustion engine 12 may generally be disposed proximate the second end portion 84 of the vehicle, and may include at least a portion that is situated between the two respective drive axles 24, 70. The engine 12 may generate a torque through the combustion of a volatile fuel, and may provide the resulting torque to a second end portion 88 of the driveshaft 22 (i.e., where the respective first and second end portions 86, 88 of the driveshaft 22 are at substantially opposite ends from each other).

An AWD motor 52 may be directly adjacent to and/or coupled with the engine 12 such that the AWD motor 52 is disposed between the engine 12 and the transaxle 14. The AWD motor 52 may be circumferentially disposed around the second end portion 88 of the driveshaft 22, such that the driveshaft 22 passes axially through an annular rotor 54. The AWD motor 52 may be configured to transmit and/or receive a torque to/from the second plurality of drive wheels 50 (e.g., via the second drive axle 70), and may be mechanically separate/isolated from the first plurality of drive wheels 16.

Each of the transaxle motor 26 and the AWD motor 52 may be driven by a power inverter module (PIM) 30 that may be in electrical communication with a rechargeable traction battery 28. The operation of the PIM 30, the engine 12, and the transaxle 14 may each be controlled by a controller 40 that attempts to manipulate the various components to efficiently respond to a torque request 42 that is provided by a user input device 44, such as an accelerator pedal.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. An all-wheel drive vehicle comprising:

a first drive axle and a second drive axle separated by a distance, each drive axle coupled with a respective pair of drive wheels, wherein the first drive axle defines a first end portion of the vehicle and the second drive axle defines a second end portion of the vehicle;

a driveshaft disposed between the first end portion and the second end portion of the vehicle;

a transaxle disposed in mechanical communication with the first drive axle and disposed at the first end portion of the vehicle;

an internal combustion engine disposed proximate the second drive axle, proximate to the second end portion of the vehicle, and coupled with the transaxle via the driveshaft;

a first electric motor coupled directly to the internal combustion engine, wherein the first electric motor is disposed proximate to the second end portion of the vehicle and between the internal combustion engine and the transaxle, and wherein the first electric motor is in mechanical communication with the second drive axle; and a second electric motor coupled with the transaxle and disposed at the first end portion of the vehicle, wherein the second electric motor is in mechanical communication with the first drive axle.

2. The vehicle of claim 1, wherein the first electric motor is circumferentially disposed about the driveshaft.

3. The vehicle of claim 1, wherein the first electric motor is mechanically isolated from the first drive axle.

4. The vehicle of claim 1, wherein the first electric motor includes an annular rotor disposed within a stator; and wherein the first end portion of the driveshaft extends through the annular rotor.

5. The vehicle of claim 1, wherein the first end portion is a rear portion of the vehicle; and wherein the second end portion is a front portion of the vehicle.

6. The vehicle of claim 1, wherein the second electric motor is integrated into the transaxle.

* * * * *